Oct. 7, 1969  A. R. VAN BAELEN  3,471,822
TERMINAL JUNCTION SYSTEM FOR ELECTRICAL CONDUCTORS
Filed July 26, 1967  5 Sheets-Sheet 1
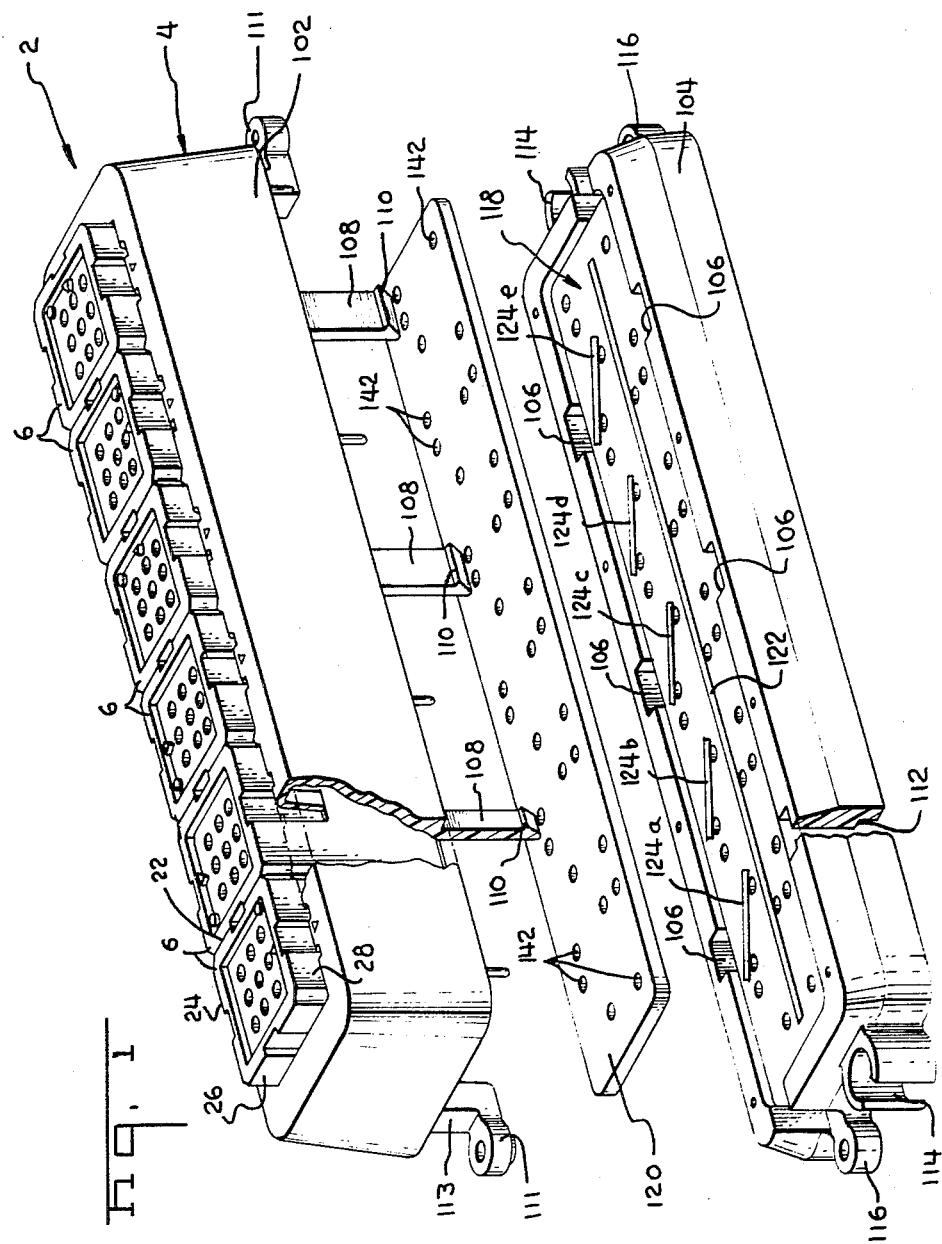

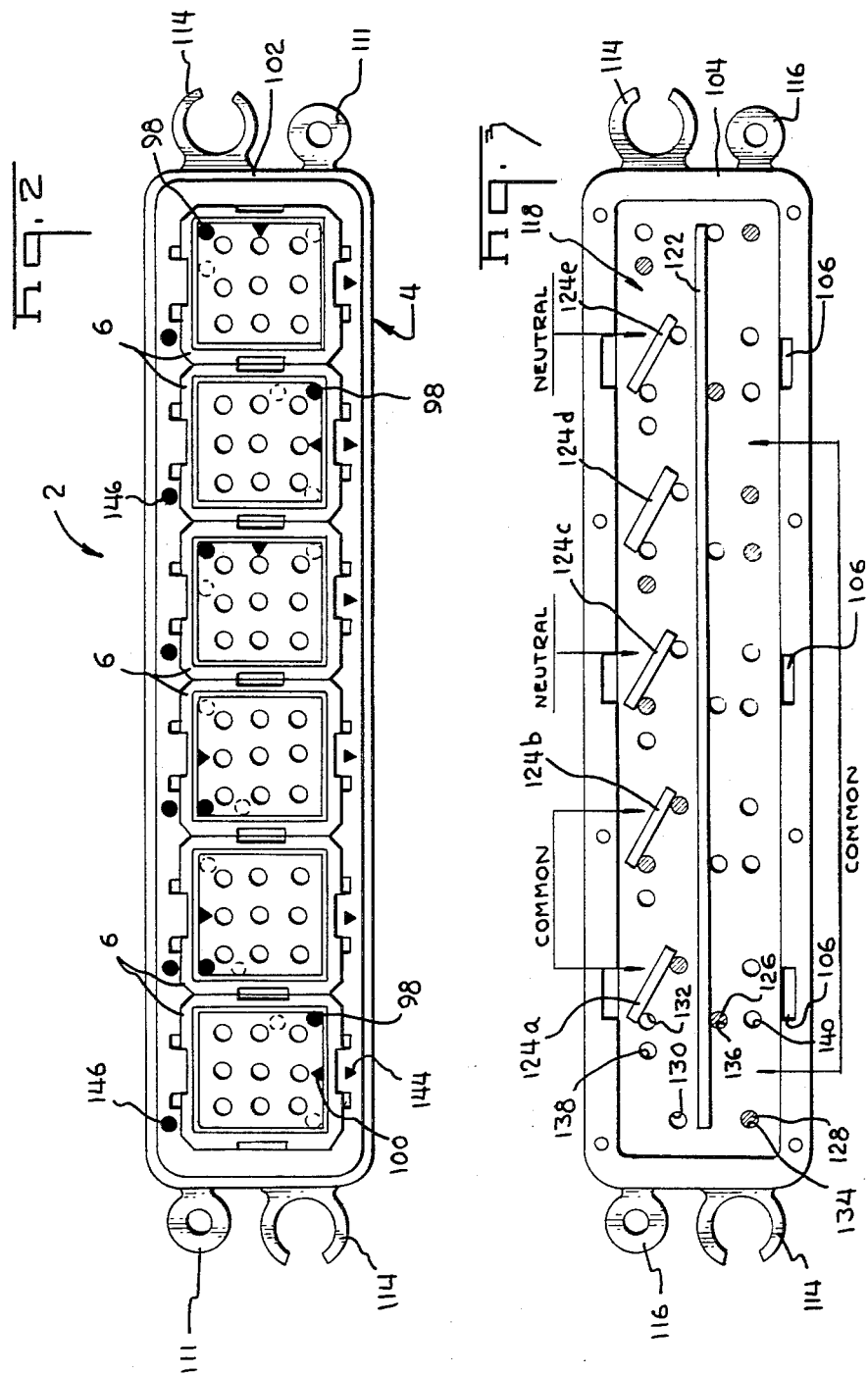

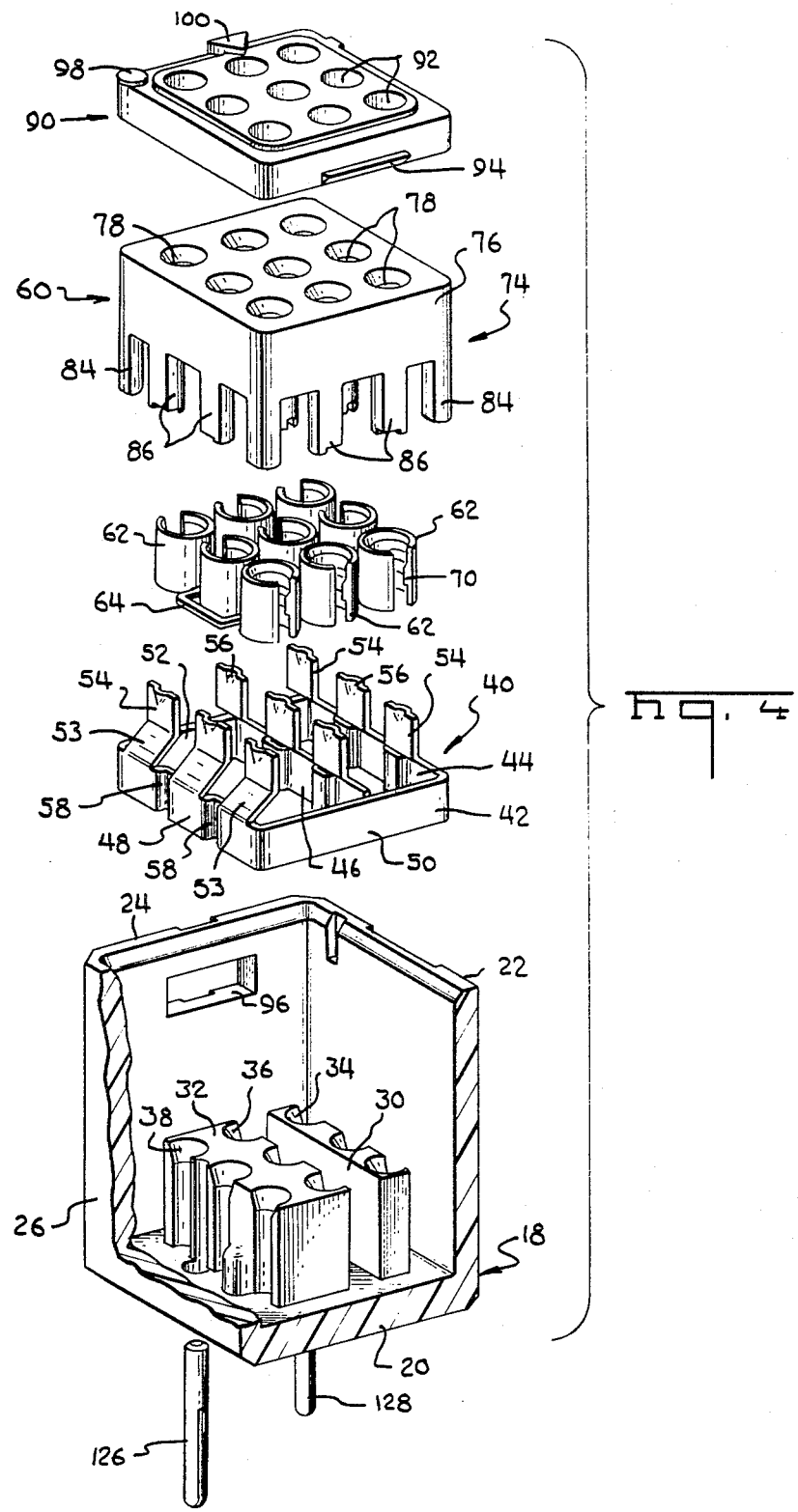

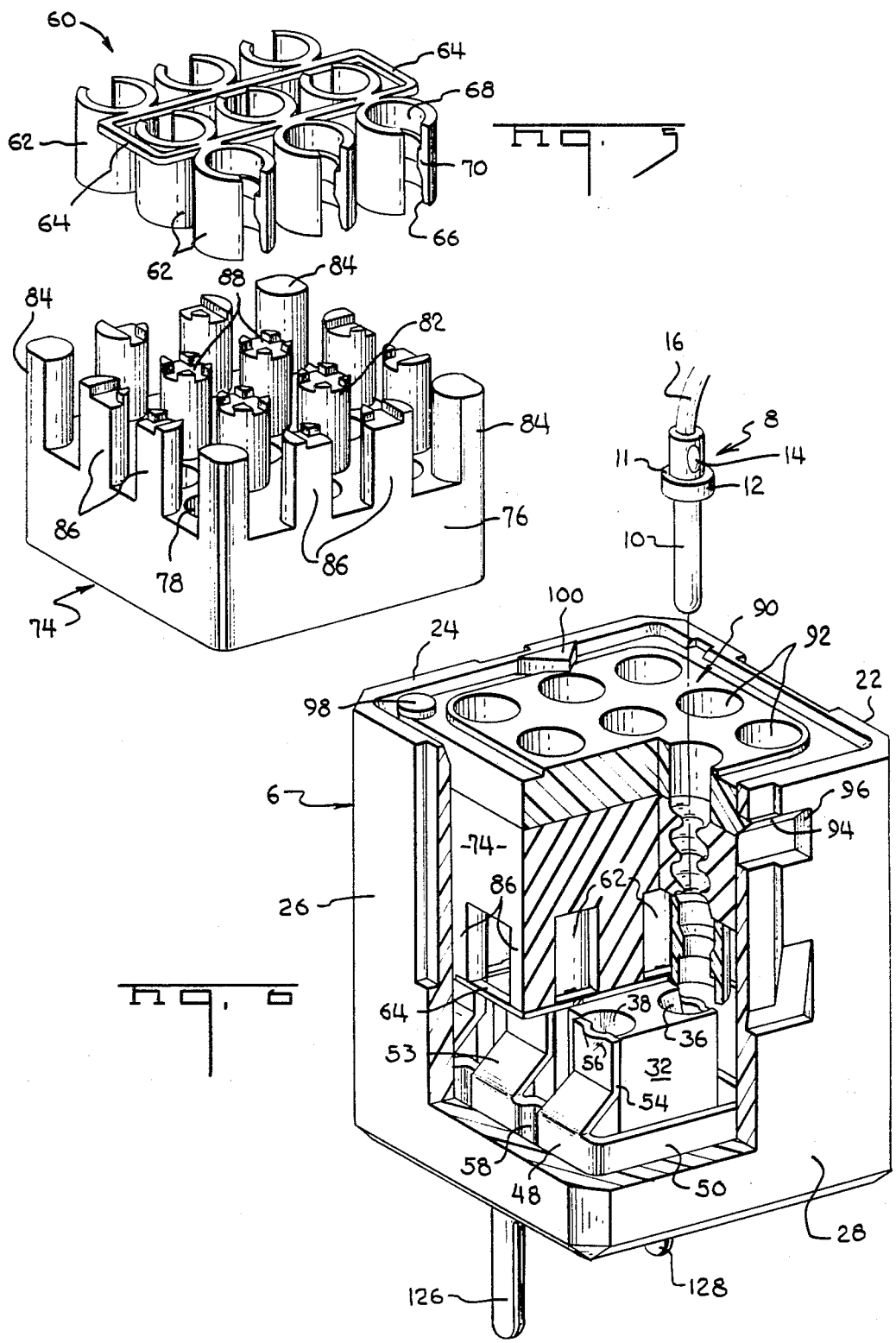

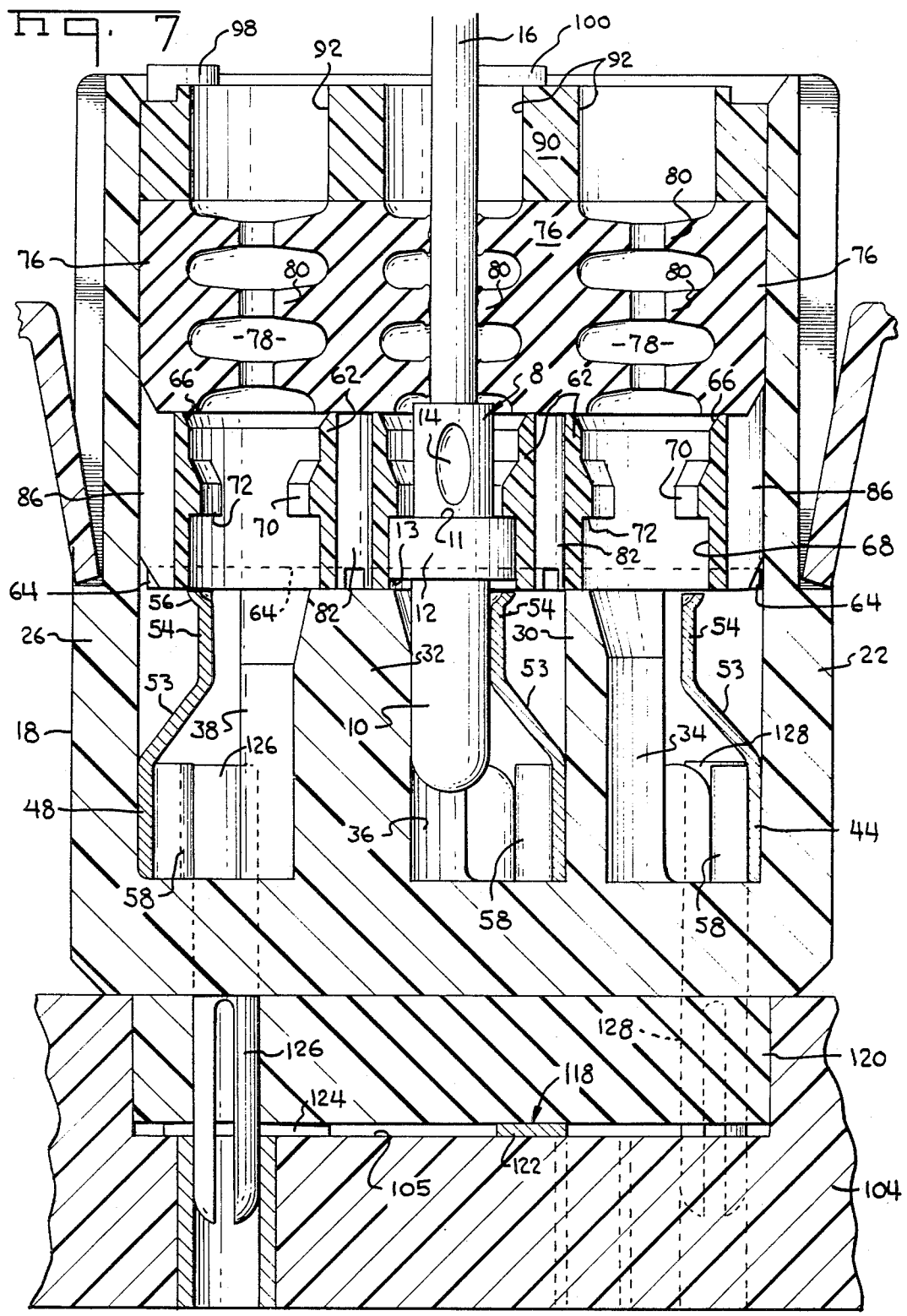

United States Patent Office 3,471,822
Patented Oct. 7, 1969

3,471,822
TERMINAL JUNCTION SYSTEM FOR ELECTRICAL CONDUCTORS
Armand Robert Van Baelen, Lansdowne, Pa., assignor to AMP Incorporated, Harrisburg, Pa.
Filed July 26, 1967, Ser. No. 656,134
Int. Cl. H01r 29/00, 9/12, 25/00
U.S. Cl. 339—18                                11 Claims

ABSTRACT OF THE DISCLOSURE

Modular terminal junction system for electrical conductors comprises a plurality of identical connector modules each of which is adapted to receive a plurality of contact pins which are secured to the ends of wires. Individual modules are plugged into receptacles which accept a plurality of such modules. Conducting strips in the individual modules are contacted by the contact pins so that conductors plugged into a single module are electrically common. In addition, receptacle has bus bar means therein for electrically connecting the conducting strips in individual modules to the conducting strips of other modules. Adjacent modules may be commoned when they are plugged into the receptacle in one orientation. Modules remote from each other will be electrically commoned to each other when they are plugged into the receptacle in a second orientation. Modules plugged into receptacles in a third orientation are electrically separate from the other modules in the receptacle.

BACKGROUND OF THE INVENTION

Terminal junction systems for interconnecting varying numbers of conductors to each other are widely known and used in the electrical arts. Ordinarily, these interconnection systems comprise a plurality of module-like units which are mounted in a suitable container or frame, each module being adapted to receive two or more terminals secured to the ends of wires to form common connections among the terminals. In most known types of terminal junction systems, the modules are more or less permanently mounted in their mounting means and cannot be plugged or unplugged therefrom. It is thus necessary to remove the individual terminals from the modules in order to break an electrical connection. Furthermore, the known types of terminal junction systems are relatively bulky and heavy and are not suited where space and weight considerations are important. The known types of systems are not sealed from the atmosphere and are therefore used only under relatively non-critical circumstances.

The present invention is addressed to the problem of providing an improved terminal junction system or interconnection system which is relatively compact and light in weight, which permits the interconnection of varying numbers of conductors, and which has pluggable connector modules which can be individually removed from the mounting means in which the modules are contained.

It is accordingly an object of the invention to provide an improved terminal junction system for electrical conductors. A further object is to provide a terminal junction system comprising a plurality of pluggable modules which can be electrically isolated from each other to make common connections among their contained conductors or which can be commonly connected to each other. A still further object of the invention is to provide an improved module for an electrical terminal junction system. A still further object is to provide an interconnection or terminal junction system comprising a plurality of modules in which the modules can be electrically connected to each other, regardless of their positions in the system, or can be electrically isolated from other modules in the system. A still further object is to provide a system in which the individual modules are sealed from the atmosphere so that the system is adapted for use in critical circumstances where atmospheric sealing is required.

These and other objects of the invention are achieved in one embodiment thereof comprising a receptacle means which is adapted to receive a plurality of pluggable modules in side-by-side relationship to each other. The connector modules each contain contact strip means having a plurality of contacts thereon arranged such that when a terminal crimped to the end of the wire is plugged into a module, the terminal would electrically engage the contact strip so that terminals inserted into a single module are commoned to each other. This strip can be a continuous strip whereby all of the inserted contacts in a single module are commoned to each other or can be in the form of two or more separate strips so that the module will provide common connections for up to four groups of inserted conductors with the groups being electrically separated from each other. The receptacle means contains bus bar means which is effective to electrically connect the contact strips of individual modules with the contact strips of other modules. Specifically, an individual module can be inserted into the receptacle in any one of three modes or orientations. When an individual module is inserted into a receptacle in its first mode or orientation, it will be electrically connected to an adjacent module which is also in the same orientation or mode. If the module is inserted in the second mode or orientation, it is electrically connected to other modules in the receptacle, whether adjacent or remote, which are also in the second mode or orientation. Finally, if it is desired that a given module be electrically isolated from the other modules in the receptacle, it is inserted into the receptacle in its third mode or orientation. In accordance with the preferred embodiment of my invention, the receptacle is sealed from the atmosphere and the individual pluggable modules are also sealed so that the contacts within the modules and receptacle are not subjected to the corrosive effects of the atmosphere.

In the drawings:

FIGURE 1 is a perspective exploded view of a junction or interconnection unit in accordance with the invention, it being understood that a plurality of such units might be used adjacent to each other in a complete system;

FIGURE 2 is a top plan view of the interconnection unit of FIGURE 1;

FIGURE 3 is a sectional plan view of the unit of FIGURE 1 illustrating the bus bar means for making interconnections among different modules;

FIGURE 4 is an exploded view of an individual connector or terminal junction module;

FIGURE 5 is a perspective view of a sealing insert and a retaining means of the module shown in FIGURE 4, this view showing the parts in an inverted position to reveal details of their structure;

FIGURE 6 is a perspective view, on an enlarged scale and with parts broken away, of an individual module; and FIGURE 7 is a sectional side view of a connector module illustrating its relationship to the bus bar means in the receptacle.

Referring first to FIGURE 1, a terminal junction unit 2 in accordance with the invention comprises a generally rectangular receptacle 4 in which are mounted a plurality of pluggable modules 6. The modules have, in the disclosed embodiment, nine contact receiving cavities, each cavity being adapted to receive a contact terminal pin 8 (FIGURE 7) which is crimped onto the end of a wire 16. These terminal pins comprise specifically a generally cylindrical contact tip 10, and an intermediate circumferential collar 12 which defines an upwardly facing shoulder 11, as viewed in FIGURE 7, and a downwardly facing shoulder 13. The upper end of the terminal is crimped as shown at 14 onto the stripped end of the wire 16.

Referring now to FIGURES 4 and 5, the individual modules 6 each comprise a box-like housing or shell 18 which is square in cross-section and which is open at its upper end. Sidewalls 22, 24, 26, 28 extend upwardly from the floor 20 of the housing 18 and the other parts of the module shown in FIGURE 4 are contained in the housing. Barrier blocks 30, 32 integral with the floor 20 and extending upwardly therefrom are provided with cylindrical recesses 34, 38 on their sides which are adapted to receive the contact tip portions 10 of inserted terminals. Specifically, the barrier member 30 has semi-cylindrical cavities 34 which face the sidewall 22. The barrier 32 has cavities 36 which face the barrier 30 in additional cavities 38 which face the sidewall 26. These barriers function to maintain the contact strip 40 which is described below, in its proper position in the block when the parts are assembled. The housing block or shell 18 may be of any suitable relatively firm insulation material such as styrene or polyethylene. It is advantageously manufactured by an injection molding process as are the other plastic parts of the assembly.

The contact strip 40 should be of a suitable conducting material having adequate strength and resilience to establish a low resistance stable electrical contact with an inserted pin, a suitable material being Phosphor bronze in a half hard temper. This contact strip 40 comprises a carrier strip generally indicated at 42 and bent to form three parallel sections 44, 46, 48 and a pair of end sections 50, 52. Contact ears 54 are integral with the carrier strip and are connected thereto by neck sections 53 which extend obliquely with respect to the plane of the carrier strip so that the contact portions 54 are offset with respect to the carrier strip. The contact ears 54 are formed with a centrally located conical depression 56 at their upper ends which functions to guide an inserted terminal downwardly during insertion. When the contact strip 40 is assembled to the housing 18, it is lower, as viewed in FIGURE 4, into the housing in an orientation such that the parallel strip section 44 is adjacent to the sidewall 22, the end section 50 is adjacent to the sidewall 28, and the end section 52 is adjacent to the sidewall 24 of the housing. The carrier strip section 46 will then extend between the barriers 30, 32 and the strip section 48 will be disposed adjacent to the internal surface of the sidewall 26. The portions of the carrier strip which lie between the contact ears 54, are inwardly formed as shown at 58 thereby to shorten the spacing between adjacent contact ears. As will be apparent from an inspection of this strip, it is advantageously manufactured by die stamping and forming operations.

The contact terminals are retained in the modules and against the contact ears 54 by means of individual cylindrical retainers 62 (see FIGURE 5) which have an axially extending open seam and which are integral with the generally rectangular carrier 64. These retainers 62 may be of nylon, glass filled nylon, or other relatively hard plastic and may be manufactured by conventional molding techniques in which case the rectangular member 64 may constitute the sprue or runner. A distinct advantage of forming these retainers of moldable material as shown in FIGURES 4 and 5 is that all of the retainers for an individual module are manufactured as a single piece which can be easily and simply mounted in the module at the time of assembly. Alternatively, these retainers 62 can be of metal and can be manufactured by die stamping and forming methods.

In any event, each retainer 62 in the disclosed embodiment is of generally cylindrical shape and has a normal inside diameter 68 at its upper and lower ends which is sufficient to permit passage of the contact terminals 8 therethrough. The upper ends of the retainers are bevelled to form a conical lead-in surface 66 which assists in guiding the terminals during insertion. Intermediate their ends, the retainers are provided with a constriction 70 which defines a downwardly facing shoulder 72 (as viewed in FIGURE 7) adapted to lodge against the upwardly facing shoulder 13 of an inserted contact. During insertion, as the terminal moves downwardly as viewed in the drawing, the retainers will be sprung apart by virtue of the fact that they have axial seams until the collar 12 passes the constriction 70 at which the retainers will return to their normal positions and retain the contacts in the module. After such insertion, the contact tip portions 10 of the terminals will bear against the contact portions 56 of the connector strip.

A sealing insert 74 contained in the housing 18 above the contact strip functions to seal the individual contact receiving cavities of the module from the atmosphere when these cavities contain an inserted terminal as shown in FIGURE 7. This sealing insert 74 is advantageously of a relatively tough and durable rubber-like material such as a silicone rubber or a neoprene rubber. This insert comprises a generally rectangular block 76 having openings 78 extending therethrough into which the terminals are inserted, these openings have two or more constricted neck portions 80. The diameter of these constricted neck portions 80 is less than the diameter of the wire 16 so that after insertion, these neck portions will be resiliently deformed and bear against the surface of the wire to provide the sealing effect. It will be apparent that the sealing insert must thus be of a rubber-like material to permit passage of the terminal and wire during insertion. A plurality of generally cylindrical projections 82, 84, and 86 extend downwardly from the underside of the block portions 76 of the insert and are so located that they will extend between the contact terminals 8 which have been inserted into the module. The centrally located projections 82 have grooves 88 extending at right angles to each other on their lower ends (their upper ends as viewed in the inverted view, FIGURE 5) which are adapted to receive the frame-like member 64 of the retainer assembly 60. The corner projections 84 have flat sides so that they will lodge snugly in the corners of the housing and the side projections 86 similarly have flat sides so that they will bear against the sides of the housing. It should also be noted that these side projections 86 have grooves adapted to accommodate the frame member 64 of the retainer member 60. The projections 82, 86 thus function to locate retainer member 60 in its proper position during assembly.

The upper open side of the housing or shell member 18 is closed by a rectangular sealing plate or cover plate generally indicated at 90. This cover plate should be of a comparatively firm plastic material such as dyalphthalate or a very firm nylon. Plate 90 has openings 92 which are in alignment with the openings 78 of the sealing insert and has locking projections 94 on two opposite sides which are adapted to enter rectangular openings 96 in the sides 24, 28 of the housing 18. During assembly, the plate 90 is moved downwardly and against the upper surface of the sealing insert 74 until these projections 94 snap into the openings 96 thereby to lock the several parts of the module in position. The upper surface of the sealing plate 90 is provided with a circular boss 98 in one corner and an adjacent triangular boss 100 which is disposed intermediate two of the corners of the plate. These bosses provide a visual indication of the orientation or mode in which the module is mounted in the receptacle and thereby show whether the module is electrically commoned to an adjacent module, to a remote module, or is electrically neutral as will be explained more fully below.

The receptacle 4 into which the individual module connectors are plugged comprises a generally rectangular molded sidewall section 102 of nylon or glass filled nylon and a base member 104 of a similar material. The section 102 of the receptacle is assembled to the base 104 by means of depending arms 108 having hook-like lower ends 110. These arms are adapted to enter slots 106 in the base 104 which are undercut as shown at 112 (FIGURE 1) to provide downwardly facing shoulders for co-operation with the hooks 110. Integral interfitting eyes 114, 116 are provided at the ends of the base 104 of the receptacle so that a plurality of adjacent receptacles mounted on a panel can be interlocked with each other and secured to the panel by suitable fasteners extending through these eyes. The sidewall section 102 of the receptacle is also provided with eyes 111 at its ends which are integral depending arms 113. The eyes 111 of each receptacle are adapted to be received in the eyes 114 on an adjacent receptacle above the eyes 116 of the adjacent receptacles to lock the sidewall sections of the receptacles in position.

A bus bar panel generally indicated at 118 is supported on the floor 105 of the base member 104 and a sealing panel of resilient material 120 is mounted above the bus bar panel. Bus bar panel 118 has an elongated bus bar of copper or the like 122 extending for its length and midway between its sides. An additional series of bus bars 124a, 124b, 124c, 124d, and 124e extend obliquely towards the bus bar 122 on one side thereof.

The individual connector modules 6 may optionally be electrically connected to each other by means of contact pin members 126, 128 which extend through, and are mounted in, the floors of the housings 18 and which are adapted to make contact with the bus bars 122, 124. The pin 126 is in electrical contact with the carrier strip portion 48 of the contact strip 40 as shown in FIGURE 4 and is adjacent to the sidewall 26 of the housing 18. The pin 12 is in electrical contact with the carrier strip portion 44 which, in the assembled module, is disposed adjacent to the housing sidewall 22. These pins may be of any suitable conductive material such as 70–30 brass in a half-hard temper. The lower ends of the pins in the disclosed embodiment are slotted to impart a slight resilience to them and to improve their electrical contact with the bus bar.

Referring now to FIGURE 3, the sealing panel 120 is provided with a plurality of opening which are adapted to receive the connecting contact pins 126, 128. It will be apparent that these openings are arranged in a repetitive pattern, each group of similar openings lying beneath the space occupied by a single inserted connector module 6. The openings 130, 132 are so located that they will accept the pins 126, 128 when a module is in a first orientation, this first orientation being indicated by the fact that the circular boss 98 on the upper side of the module is in alignment with a similarly shaped boss 146 on the upper side of the receptacle 4. The openings 132 are adjacent to, and intersect, the obliquely extending bus bars 124a–124e at a location adjacent to the side of the receptacle 4. The openings 130 are located such that they intersect the obliquely extending bus bar conductors 124a–124e at a location adjacent to the center line of the panel 118. It follows that if two adjacent modules are oriented such that the bosses 98 on their upper sides are in alignment with the corresponding bosses 146 on the receptacle and inserted into the receptacle, these two adjacent connector modules will be electrically commoned to each other by an obliquely extending bus bar. Thus, in FIGURE 2, the second and third connector modules from the left are electrically commoned to each other by the obliquely extending bus bar 124b in FIGURE 3. In FIGURE 3, the openings in the bus bar panel 120, which are filled with contact pins 126 or 128, are cross-hatched to indicate the manner in which the modules are either electrically connected to each other or electrically isolated from the other modules. The opening 130 at the left hand end of the panel 118 and the opening 132 at the right hand end of the panel are non-functional since they do not intersect any of the obliquely extending bus bars 124a–124e but must be provided to accept the pins 126, 128 of the end plug members 6.

The openings 134, 136 of each group of openings are located such that if a module is oriented to position its pins 126, 128 in these openings, it will be electrically commoned to any other module in the receptacle which is similarly oriented. This effect is achieved by virtue of the fact that the openings 136 are adjacent to, and intersect, the elongated conductor 122 and if a pin extending from a connector module is inserted into any of these openings, it will be electrically connected to the conductor 122. The opening 134 is remote from the conductors on the panel 118 and is provided only for the purpose of accommodating the pin 128 of a module inserted such that its pin 126 enters an opening 136.

In FIGURE 2, the module at the extreme left in the receptacle 4 is electrically commoned with the fifth module from the left since the contact strips 40 of these modules are electrically connected to the conductor 122 by virtue of the fact that they have their pins 126 extending into the appropriate openings 136. This commoning of connector modules which are remote from each other is indicated by the fact that the bosses 100 on the upper sides of the modules are in alignment with the bosses 144 on the upper side of the receptacle.

If it is desired to have a module 6 which is electrically neutral, that is, which is not connected to any of the other modules in the receptacle, the module is inserted in an orientation such that its pins enter the openings 138, 140. Neither of these openings, as can be seen in FIGURE 3, are in contact with any of the bus bar strips 122 or 124a–124e. As is apparent from FIGURE 2, when a module is inserted in a neutral position, the bosses 98, 100 on the upper sides of the modules are not in alignment with any of the bosses 146, 144 on the upper side of the receptacle.

It will be apparent then that the electrical connections between the modules is instantly indicated by the bosses 98, 100 on the connector modules and 144, 146 on the upper side of the receptacle.

The sealing plate 120 has a plurality of openings 142 extending therethrough to permit passage of the pins 126, 128 regardless of the orientation of the connector module. The individual connector modules are sealed as between the sides of the modules and the internal sides of the recptacle portion 102. The entire system is thus sealed from the atmosphere. If less than six modules are used in a single receptacle, the remaining space in the module can be sealed by a sealing block shaped like one of the modules but not having contact receiving cavities or terminal strip therein.

A distinct advantage of the invention is that the individual terminal junction modules can be removed from the receptacle without removing the contact pins from the modules. The modules there have the attributes of a multi-contact disengageable electrical connector and can be used to disengageably connect one piece of electronic equipment with other equipment in a way which will permit the one piece of equipment to be disconnected from the system.

The invention as described thus far provides only for the common connection of nine individual conductors 16 extending into an individual connector module. If it is desirable to electrically common a number of conductors which is less than nine, the contact strip can be cut at predetermined locations to provide common connections among three or six conductors.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. Means for making interconnections among electrical conductors comprising:
a plurality of insulating modules, each of said modules being adapted to receive the terminal portions of conductors and having conductor commoning means therein for electrically commoning said conductors,
mounting means for mounting said modules, said modules each being mountable on said mounting means in any one of three modes,
said mounting means having first and second module commoning means, each of said modules having contact means for connecting its conductor commoning means to said first module commoning means when said module is in a first one of said modes, for connecting its conductor commoning means to said second module commoning means when said module is in a second one of said modes, said contact means being isolated from said first and second module commoning means when said module is in the third one of said modes,
said first module commoning means being effective to electrically connect adjacent modules which are in said first mode, said second commoning conductor means being effective to electrically connect all modules which are in said second mode.

2. Interconnection means as set forth in claim 1 wherein said mounting means comprises a receptacle, said modules comprising connector plugs, said plugs being individually insertable into, and removable from, said receptacle.

3. Interconnection means as set forth in claim 1 wherein said conductor commoning means in each of said modules comprises contact sockets which are electrically connected to each other.

4. Interconnection means as set forth in claim 3 wherein said conductors received by said modules comprise first contact pins, said first pins being matable with said sockets.

5. Interconnection means as set forth in claim 1 wherein said contact means comprises second contact pins electrically connected to said conductor commoning means and extending from said modules.

6. Interconnection means as set forth in claim 5 wherein said first module commoning means comprises a series of conducting strips on said mounting means, said strips extending obliquely with respect to the axis of an aligned series of modules on said mounting means, each of said strips having an integral receptacle for one of said second contact pins.

7. Interconnection means as set forth in claim 5 wherein said second module commoning means comprises a strip of conductor extending parallel to a battery of modules on said mounting means, said strip having a plurality of receptacles for reception of one of said second contact pins of each module.

8. Means for making disengageable electrical connections among a plurality of electrical conductors comprising:
a plurality of multi-contact connector plugs, each plug containing a plurality of contact terminals on the ends of conductors,
a receptacle, said connector plugs being contained in said receptacle in side-by-side relationship,
means effective between said connector plugs and said receptacle for releasably retaining said plugs in said receptacle, said plugs being individually releasable and removable from said receptacle, and
interconnection means in said plugs and in said receptacle for commonly connecting contact terminals in individual plugs, for commonly connecting contact terminals in different plugs, and for individually connecting individual terminals in one plug with individual terminals in another plug.

9. A multi-contact electrical connector comprising:
an insulating housing,
a plurality of contact-receiving cavities extending into said housing,
contact retaining means in said housing, said contact retaining means comprising a unitary molding of connected individual retaining members, each of said retaining members comprising a split sleeve adapted to be resiliently sprung apart upon insertion of a contact and being adapted to engage said contact after insertion to retain said contact in said housing, and
contact strip means in said housing adjacent to said retaining means, said contact strip means being adapted to be engaged by said contacts after insertion thereby to commonly connect said contacts.

10. Means for making interconnections among electrical conductors comprising:
a plurality of insulating modules, each of said modules being adapted to receive the terminal portions of conductors and having conductor commoning means therein for electrically commoning said conductors,
mounting means for mounting said modules, said modules each being mountable on said mounting means in one of two modes,
said mounting means having module commoning means, each of said modules having contact means for connecting its conductor commoning means to said module commoning means when said module is in one of said modes, said contact means being electrically isolated from said module commoning means when said module is in the other one of said modes, whereby,
modules mounted in said mounting means can be either electrically isolated from each other or can be electrically commoned with each other.

11. Means for making interconnections as set forth in claim 10 wherein said module commoning means is effective to common any modules which are in said one mode and are adjacent to each other.

References Cited

UNITED STATES PATENTS

| | | | |
|---|---|---|---|
| 2,214,065 | 9/1940 | Pennock et al. | 339—31 |
| 2,417,928 | 3/1947 | Guernsey | 339—31 |
| 3,165,369 | 1/1965 | Maston | 339—217 X |
| 3,172,721 | 3/1965 | Kelly | 339—217 |

FOREIGN PATENTS

| | | |
|---|---|---|
| 1,431,912 | 2/1966 | France. |

RICHARD E. MOORE, Primary Examiner

U.S. Cl. X.R.

339—198, 206